(No Model.)
R. M. HUNTER.
ELECTRIC RAILWAY.
No. 435,662. Patented Sept. 2, 1890.
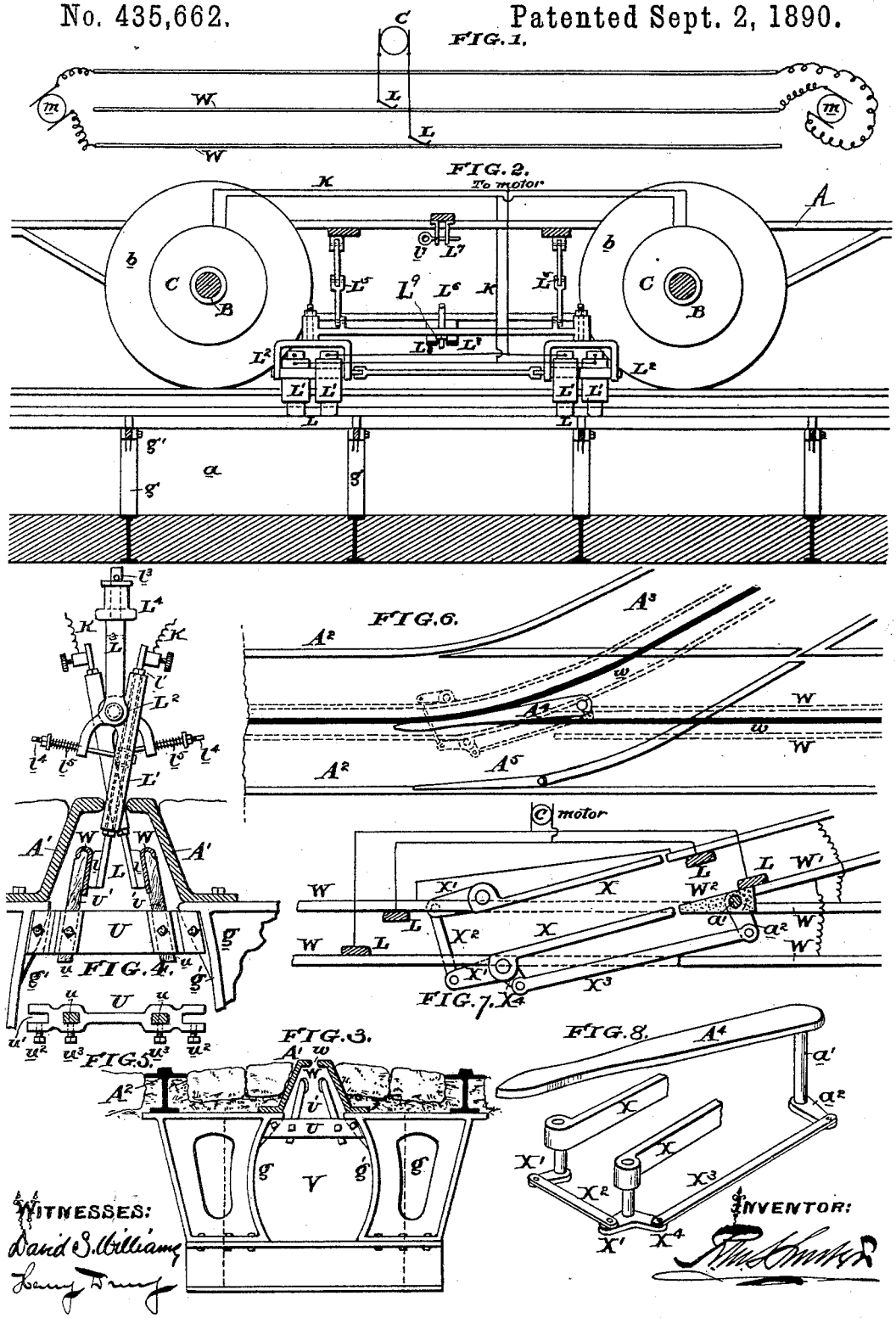

UNITED STATES PATENT OFFICE.

RUDOLPH M. HUNTER, OF PHILADELPHIA, PENNSYLVANIA, ASSIGNOR TO THE THOMSON-HOUSTON ELECTRIC COMPANY, OF CONNECTICUT.

ELECTRIC RAILWAY.

SPECIFICATION forming part of Letters Patent No. 435,662, dated September 2, 1890.

Original application filed February 23, 1887, Serial No. 228,533. Divided and this application filed October 18, 1889. Serial No. 327,460. (No model.)

*To all whom it may concern:*

Be it known that I, RUDOLPH M. HUNTER, of the city and county of Philadelphia, and State of Pennsylvania, have invented an Improvement in Electric Railways, of which the following is a specification.

My invention has reference to electric railways; and it consists of certain improvements, all of which are fully set out in the following specification and shown in the accompanying drawings, which form part thereof.

This application (Case 116) is a division of my application, Serial No. 228,533, filed February 23, 1887.

My improvements relate to circuits, switches, conduits to house the conductors, and current-collecting devices carried by the electrically-propelled vehicle; and such improvements are fully described hereinafter and clearly illustrated in the drawings, in which—

Figure 1 is a diagram illustrating my improved arrangement of circuits for supplying current to the vehicle or car. Fig. 2 is a sectional elevation of my improved electrically-propelled vehicle, collectors, and working-conductor. Fig. 3 is a cross-section through a road-bed, conduit, and working-conductors. Fig. 4 is a cross-section of the upper part of the conduit and working-conductors, showing their means of support and an elevation of the current-collectors in operative position with the conductors in the circuit. Fig. 5 is a plan view of the working-conductor support. Fig. 6 is a plan view of the road-bed and conduit at a branching point or where a branch track unites with the main track. Fig. 7 is an enlarged plan view of the working-conductor switches at the point of branching, and it also shows the relative contact positions of the various collectors depending from the car; and Fig. 8 is a perspective view showing the connections between the slot-switch and conductor-switches, whereby all three move at the same time.

A is the truck-frame, or, if desired, may be considered the car-frame.

B are the two axles, having the wheels $b$ secured thereon and journaled in suitable boxes held by the frame A. These boxes are not shown, but are of any ordinary construction.

C C are the electric motors, which are mechanically connected with the axles for the purpose of propelling the vehicle or car.

A suitable construction and arrangement of the motor is shown in my application of which this is a division.

V represents the conduit, which is here shown in all material respects like the cable-railway conduit in use in New York city, it having the brackets $g$, to which the rails $A^2$ and the slot-irons $A'$ are secured. The bottom and side walls $a$ of the conduit are formed of concrete in the well-known manner.

I do not claim anything on the specific construction of the conduit and road-bed *per se*, my invention having reference to additions thereto by which the ordinary cable-railway conduit may be readily converted into an electric-railway conduit substantially of the construction set out in my applications, Serial No. 214,309, of September 23, 1886, and Serial No. 225,498 of January 26, 1887.

The brackets $g$, which are arranged about every five feet along the conduit, are provided with internal ribs $g'$, and to these ribs on each side of the conduit and immediately below the slot-irons $A'$, I clamp the supports U, which are made of the form shown in Figs. 4 and 5. These supports have slots $u'$ on their ends to receive the flanges $g$, in which they are clamped by set-screws $u^2$. The supports are also provided with sockets $u$, into which the vertical insulating-pieces $U'$ are inserted and clamped by the set-screws $u^3$. These insulators $U'$ may be of any form or material desired, being preferably formed of vulcanized fiber made water-proof. The working-conductors W are supported by these insulators and are held up between the slot-irons and comparatively near to the slot. This leaves a large slush-conduit below the conductors to carry off slush, rain-water, and all the dirt which may enter the conduit. By this means a cable-railway conduit as now in use may be converted into a construction suitable for an electric road. It is evident that the particular construction of the conduit is immaterial, as the invention is equally applicable to other forms of cable-railway conduits now in use.

The collectors are four in number, arranged in pairs at a distance apart, and preferably between the axles of the car or truck, as shown in Fig. 2. Each pair of collectors consists of two frames or casings $L'$, which carry the insulated steel conductors having re-enforced contact-shoes $l$ at the bottom to run in contact with the conductors. Such collectors L are insulated from their casings by insulation $l'$, and are connected to the motor-circuit K in the manner shown in Figs. 2 and 7. The casings $L'$ are hinged to the longitudinal rod or shaft $L^2$, which is hung in a frame $L^3$, pivoted to the collector-frame $L^4$ on a vertical axis $l^3$. The collectors are preferably suspended from opposite sides of the shaft $L^2$, and are each drawn into contact with their respective conductors by means of a spring $l^5$, which rests upon a bracket $l^2$ from the frame $L^3$, and presses against an adjustable nut $l^6$, which is adjustable on a rod $l^4$, connecting with the casing $L'$, as shown in Fig. 4. By this means the collectors are pressed against their conductors, and the amount of pressure may be regulated by adjusting the nuts $l^6$.

By an examination of Fig. 5 it will be observed that the collectors cross each other and are hung on a longitudinal axis as well as a vertical axis. A pair of such collectors is hung from the other end of the collector-frame $L^4$ and such collectors are connected together in the manner shown—that is to say, the two positive collectors are connected together and the two negative collectors connected in like manner. This enables a double contact with the working-conductors and maintains a continuous current in the motor-circuit when passing over breaks in the working-conductors, switches, &c., this being illustrated particularly in Fig. 7. These collectors, it will be seen, consist of a primary part $L^3$, hinged to the vehicle on vertical axis $l^3$, so as to have a rotary movement about said vertical axis, and secondary parts $L'$, hinged to the primary part on longitudinal axes and having contacts pressing against the conductors, and springs moving with said primary and secondary parts for holding the contacts of the secondary parts in contact with the conductors. The collector-frame is hung by the double links $L^5$ from the truck-frame in such a manner that by doubling the links the collector-frame may bodily rise, lifting the collectors entirely out of the slotted conduit, which will be found useful when the car is made to pass over an ordinary horse-car line in case of obstruction by fire or otherwise or in case of accident to the conduit. When so raised, the loop $L^6$ on the collector-frame is passed between the parts $L^7$, and the pin $l^7$ is shot through the loop sustaining the collector-frame and the collectors. When in operation, the collector-frame is prevented from moving longitudinally by means of the stud or pin $L^9$, secured thereto, passing between two transverse bars $L^8$, as shown in Fig. 2. While this prevents longitudinal movement, it at the same time admits of free lateral movement as well as oscillation about $L^9$ as a center, and this in connection with the adjustment of the collectors themselves admits of every possible movement to follow the smallest irregularity in the conduit-slot or conductors.

Fig. 6 is a plan view at a branching point, showing a slot-switch thrown into position to guide the collectors on the branch, and also showing the conductors and their switches in dotted lines, indicating their positions below the slot.

$A^4$ represents the slot-switch, which is substantially similar to that used in cable railways.

The plan view of the conductors is shown in Fig. 7, in which W W are the main conductors and W' the branch conductors. The union of the branch and main conductors terminates in a point $W^2$, which may be formed of metal insulated from the conductors or insulating material, as such conductors are of different polarities.

X X are two switches formed of part of the main conductors, and connected together by arms X' and link $X^2$, so that when one is shifted the other is shifted also, and they are also electrically connected with the main conductors. As shown, X X are shifted to correspond with the slot-switch; but it will be observed that they are thrown in the opposite direction and also point of branching. To make the slot-switch and the conductor-switches move simultaneously, they may be connected by the link $X^3$ and arms $X^4$ and $a^2$, which latter is upon the vertical shaft $a'$ of the slot-switch $a^4$. If the slot-switch be thrown upward, referring to Fig. 6, so as to open the main slot, then the conductor-switches X X will be thrown to the position indicated in dotted lines in Fig. 7. A clear idea of the connection of these switches is shown in Fig. 8.

Referring to Fig. 1, with reference to the electric circuits for supplying the motor with current, it will be observed that the two working-conductors W W have their opposite ends connected with opposite poles of two generators $m\ m$, the other poles of which generators are connected together by an electric circuit, which may be the ground, a conducting-wire, or the rails A, as indicated. This couples the generators in series, and the current from each is passed through the other. As shown, the generators are at opposite ends of the conductors, requiring two generating-stations, which might be advisable in long lines where such stations could be used for local purposes; but these generators $m\ m$ may, if desired, be arranged close together. With this construction of circuits the line-resistance through the motor and return will be the same for all positions of the motor upon the line or remain constant. Likewise the line-resistance will be the same for any number of motors on the line—that is to say, the line-resistance for each motor will be the same irrespective of the positions of the motors on the line. This is simply a specific form of the equal resistance system set out in my application, Serial No. 171,625, of 1885.

While I prefer the construction shown, I do not limit myself to the details thereof, as they may be modified in various ways without departing from my invention.

Having now described my invention, what I claim as new, and desire to secure by Letters Patent, is—

1. In an electric railway, a slotted conduit of considerable depth, a removable metallic cross-plate adapted to be secured across the conduit near the top, connecting the side walls thereof, upwardly-extending insulators carried by said cross-plates, and a working-conductor supported upon said insulators and electrically independent of the metallic cross-plate.

2. In an electric railway, a slotted conduit of considerable depth, a removable cross-plate adapted to be secured across the conduit near the top, connecting the side walls thereof, having holes or pockets, insulators carried by said cross-plates by being placed upright in said holes or pockets, and a working-conductor supported upon said insulators.

3. In an electric railway, a slotted conduit of considerable depth, a removable cross-plate adapted to be secured across the conduit near the top, connecting the side walls thereof and having substantially vertical holes or pockets, insulators carried by said cross-plates and adjustable vertically in said holes or pockets, and a working-conductor supported upon said insulators.

4. In an electric railway, a large slotted conduit having cross-bars connecting its lateral walls near the top at intervals apart, in combination with an insulated conductor supported by said cross-plates close to the slot but to one side of a vertical plane through the slot of the conduit.

5. In an electric railway, the combination of a slotted conduit, working-conductors located within said conduit, an electrically-propelled vehicle and a current-collecting device formed in two parts, each adapted to move on a longitudinal axis above the conduit, and suitable springs to cause said parts to swing in opposite directions.

6. In an electric railway, the combination of a slotted conduit, working-conductors located within said conduit, an electrically-propelled vehicle and a current-collector carried by said vehicle and consisting of a longitudinal shaft, a positive and a negative contact-shoe hinged upon said shaft and insulated at their upper portions where they pass through the slot of the conduit, and springs to force said shoes in opposite directions.

7. In an electric railway, the combination of a slotted conduit, working-conductors located within said conduit, an electrically-propelled vehicle and a current-collector carried by said vehicle and consisting of a longitudinal shaft, a positive and a negative contact-shoe hinged upon said shaft and insulated at their upper portions where they pass through the slot of the conduit, springs to force said shoes in opposite directions, and a frame supporting said longitudinal shaft and movable on a vertical axis.

8. In an electric railway, the combination of a slotted conduit, working-conductors located within said conduit, an electrically-propelled vehicle, a current-collector carried by said vehicle and consisting of a longitudinal shaft, a positive and a negative contact-shoe hinged upon said shaft and insulated at their upper portions where they pass through the slot of the conduit, springs to force said shoes in opposite directions, a frame supporting said longitudinal shaft and movable on a vertical axis, and a structure supported by the vehicle and capable of lateral movement, to which is secured the frame movable on a vertical axis.

9. In an electric railway, the combination of a slotted conduit, working-conductors located within said conduit, an electrically-propelled vehicle and two current-collectors carried by said vehicle located at a distance apart and each consisting of a longitudinal shaft, a positive and a negative contact-shoe hinged upon said shaft and insulated at their upper portions where they pass through the slot of the conduit, and springs to force said shoes in opposite directions.

10. In an electric railway, the combination of a slotted conduit, working-conductors located within said conduit, an electrically-propelled vehicle and two current-collectors carried by said vehicle located at a distance apart and each consisting of a longitudinal shaft, a positive and a negative contact-shoe hinged upon said shaft and insulated at their upper portions where they pass through the slot of the conduit, springs to force said shoes in opposite directions, and frames supporting said longitudinal shafts and movable on vertical axes.

11. In an electric railway, the combination of a slotted conduit, working-conductors located within said conduit, an electrically-propelled vehicle, two current-collectors carried by said vehicle located at a distance apart and each consisting of a longitudinal shaft, a positive and a negative contact-shoe hinged upon said shaft and insulated at their upper portions where they pass through the slot of the conduit, springs to force said shoes in opposite directions, frames supporting said longitudinal shafts on vertical axes, and a structure supported by the vehicle and capable of lateral movement and to which are secured the frames movable on vertical axes.

12. The combination of the slotted conduit, working-conductors in said conduit, an electrically-propelled vehicle, a current-collector sheath or holder extending down through the conduit-slot, and a vertically-adjustable contact-shoe in said sheath or holder.

13. The combination of the slotted conduit, working-conductors in said conduit, an electrically-propelled vehicle, a current-collector sheath or holder extending down through the conduit-slot, and a vertically-adjustable contact-shoe having a thickened contact part and made adjustable vertically in said sheath or holder.

14. In an electric railway, the combination of a slotted conduit, working-conductors located within said conduit, an electrically-propelled vehicle, two current-collectors carried by said vehicle located at a distance apart and each consisting of a longitudinal shaft, a positive and a negative contact-shoe hinged upon said shaft and insulated at their upper portions where they pass through the slot of the conduit, springs to force said shoes in opposite directions, frames supporting said longitudinal shafts and movable on vertical axes, a structure supported by the vehicle and capable of lateral movement and to which are secured the frames movable on vertical axes, and a loose connection between the longitudinal shafts of both sets of collectors.

15. In an electric railway, the combination of a branching slotted conduit and branching working-conductors contained within the conduit, an electrically-propelled vehicle, two positive and two negative contacts extending down through the slots and making contact with the conductors, said contacts being arranged in pairs, including a positive and negative contact, and said pairs of contacts being hung from the vehicle a considerable distance apart, so that one pair is beyond the branching point before the other pair reaches it to maintain a good continuous contact.

16. The combination of a conductor extending along a railway, an electrically-propelled vehicle, and a current-collecting device supported by the vehicle, consisting of a frame hinged upon a vertical axis and having a contact part jointed to the said frame on a longitudinal axis and making a traveling contact with the conductor.

17. The combination of a conductor extending along a railway, an electrically-propelled vehicle, and a current-collecting device supported by the vehicle, consisting of a frame hinged upon a vertical axis and having a spring-actuated contact part jointed to the said frame on a longitudinal axis and making a traveling contact with the conductor.

18. The combination of a conductor extending along a railway, an electrically-propelled vehicle, and a current-collecting device supported by the vehicle, consisting of a frame hinged upon a vertical axis and having a contact part jointed to the said frame on a longitudinal axis and making a traveling contact with the conductor, and a connecting-spring between the frame and contact part to cause the latter to follow all irregularities in the conductor.

19. The combination of a conductor extending along a railway, an electrically-propelled vehicle, and a current-collecting device supported by the vehicle, consisting of a frame hinged upon a vertical axis and having a contact part jointed to the said frame on an axis arranged transversely to the vertical axis and making a traveling contact with the conductor.

20. The combination of a conductor extending along a railway, an electrically-propelled vehicle, and a current-collecting device supported by the vehicle, consisting of a frame hinged upon a vertical axis and having a spring-actuated contact part jointed to the said frame on a longitudinal axis and arranged transversely to the vertical axis and making a traveling contact with the conductor.

21. The combination of a railway, a conductor extending along said railway, an electrically-propelled vehicle, a frame hinged to the vehicle, and a spring-actuated contact part carried by said frame and making a traveling contact with the conductor and movable about an axis substantially in the plane of the travel of the vehicle.

22. The combination of a railway, a conductor extending along said railway, an electrically-propelled vehicle, a frame carried by the vehicle, and a spring-actuated contact part carried by said frame and making a traveling contact with the conductor at a point in the rear of the connection of the frame with the vehicle and movable about an axis substantially in the plane of travel of the vehicle.

In testimony of which invention I hereunto set my hand.

RUDOLPH M. HUNTER.

Witnesses:
ERNEST HOWARD HUNTER,
S. T. YERKES.